US010186940B2

(12) United States Patent
Shin et al.

(10) Patent No.: US 10,186,940 B2
(45) Date of Patent: Jan. 22, 2019

(54) CHARGING SYSTEM USING WOUND ROTOR SYNCHRONOUS MOTOR

(71) Applicants: Hyundai Motor Company, Seoul (KR); Kia Motors Corporation, Seoul (KR)

(72) Inventors: Ho Joon Shin, Gyeonggi-do (KR); Mu Shin Kwak, Gyeonggi-do (KR); Su Hyun Bae, Daegu (KR); Jun Mo An, Gyeonggi-do (KR); Sung Kyu Kim, Gyeonggi-do (KR); Joo Young Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/827,614

(22) Filed: Nov. 30, 2017

(65) Prior Publication Data

US 2018/0358875 A1    Dec. 13, 2018

(30) Foreign Application Priority Data

Jun. 9, 2017  (KR) .......................... 10-2017-0072540

(51) Int. Cl.
*H02J 7/02*    (2016.01)
*B60K 6/26*    (2007.10)
(Continued)

(52) U.S. Cl.
CPC .............. *H02K 19/36* (2013.01); *B60K 6/26* (2013.01); *B60K 6/44* (2013.01); *B60L 11/1812* (2013.01);
(Continued)

(58) Field of Classification Search
None
See application file for complete search history.

(56) References Cited

U.S. PATENT DOCUMENTS 4,027,216 A * 5/1977 Rozek ...................... H02P 1/50
                                                       318/712
4,830,412 A * 5/1989 Raad ...................... F02N 11/04
                                                       290/31
(Continued)

FOREIGN PATENT DOCUMENTS

CN      102158035    8/2011
KR   10-2013-0068411    6/2013
(Continued)

*Primary Examiner* — Bentsu Ro
(74) *Attorney, Agent, or Firm* — Mintz Levin Cohn Ferris Glovsky and Popeo, P.C.; Peter F. Corless

(57) ABSTRACT

A charging system is provided. The charging system includes an inverter, a wound rotor synchronous motor that has at least one stator coil supplied with power converted by the inverter and a rotor having a plurality of field coils, and a switching circuit unit that is configured to selectively supply power to the plurality of field coils. Additionally, a controller is configured to operate the switching circuit unit to supply power from the battery to at least one of the plurality of field coils when the wound rotor synchronous motor operates as a motor and isolate the field coils from the battery and operate the switching circuit unit to supply grid power to a portion of the field coils when the wound rotor synchronous motor is charging when the wound rotor synchronous motor supplies the grid power to the field coil side to charge the battery.

11 Claims, 3 Drawing Sheets

(51) Int. Cl.
  *H02K 19/36* (2006.01)
  *H02J 7/14* (2006.01)
  *H02K 16/02* (2006.01)
  *B60L 11/18* (2006.01)
  *B60K 6/44* (2007.10)
  *H02P 27/05* (2006.01)

(52) U.S. Cl.
  CPC .............. *H02J 7/02* (2013.01); *H02J 7/1415* (2013.01); *H02K 16/025* (2013.01); *H02P 27/05* (2013.01)

(56) References Cited

U.S. PATENT DOCUMENTS

| | | | |
|---|---|---|---|
| 6,023,137 A * | 2/2000 | Kumar | B60L 11/123 318/400.27 |
| 6,771,040 B2 | 8/2004 | Kusumoto et al. | |
| 8,981,735 B2 | 3/2015 | Kamioka et al. | |
| 9,018,809 B2 | 4/2015 | Rippel et al. | |
| 2014/0232317 A1* | 8/2014 | Liu | H02P 1/50 318/718 |
| 2018/0115180 A1* | 4/2018 | Shin | H02P 6/32 |

FOREIGN PATENT DOCUMENTS

| | | |
|---|---|---|
| KR | 10-2014-0071593 | 6/2014 |
| KR | 10-1507863 | 4/2015 |

\* cited by examiner

CHARGING SYSTEM USING WOUND ROTOR SYNCHRONOUS MOTOR

CROSS REFERENCE TO RELATED APPLICATION

The present application claims priority to Korean Patent Application No. 10-2017-0072540, filed on Jun. 9, 2017, the entire contents of which is incorporated herein for all purposes by this reference.

BACKGROUND

1. Field of the Disclosure

The present disclosure relates to a charging system, and more particularly, to a charging system using a wound rotor synchronous motor capable of improving efficiency by implementing a field coil mounted on a rotor of the wound rotor synchronous motor in a double structure to selectively apply the field coil during operation as a motor and operation as a charger.

2. Description of the Related Art

Recently, due to global warming, environmental pollution or the like concerns, research and development of eco-friendly vehicles that reduce environmental pollution are actively being conducted in the automobile industry field. Accordingly, the market for the eco-friendly vehicles is expanding. Typically, the eco-friendly vehicles, electric vehicles, hybrid vehicles and plug-in hybrid vehicles use a motor generating that generates driving force by using electric energy instead of an engine that generates a driving force by burning the existing fossil fuels. Many of the eco-friendly vehicle technologies using electric energy drive a motor by charging a battery mounted within the vehicles from a grid. Accordingly, the eco-friendly vehicles using electric energy need to include an on-board charging circuit for charging the battery with the electric energy supplied from the grid.

The on-board charging circuit is an essential circuit for charging the battery of the eco-friendly vehicle and may be implemented using various topologies. However, many of the on-board charging circuits include a high frequency transformer and a filter for insulation, a plurality of switching elements, and a control module. Accordingly, the eco-friendly vehicle typically include the on-board charging circuit separately and the cost and a volume of the vehicle are inevitably increased. In particular, the transformer provided in the on-board charging circuit requires magnetic circuit and a size of the transformer increases according to capacity and which increases the weight and volume.

In the related art, a charging system using a wound rotor synchronous motor in which a separate charger circuit for charging a battery is omitted and an insulating transformer is implemented using an electrical coupling between a stator coil of a wound rotor synchronous motor and a field coil mounted on a rotor is disclosed. Accordingly, a separate on-board charging circuit is not required. Therefore, it is expected that charging performance of a battery of a plug-in hybrid vehicle using a wound rotor synchronous motor is improved at low cost and with a simplified configuration. However, the related art has a problem since the rotor side field coil of the wound rotor synchronous motor is manufactured considering only the efficiency of the motor, and thus, the efficient driving characteristics when the wound rotor synchronous motor is operated as the charger cannot be obtained.

The contents described as the related art have been provided merely for assisting in the understanding for the background of the present disclosure and should not be considered as corresponding to the related art known to those skilled in the art.

SUMMARY

The present disclosure provides a charging system using a wound rotor synchronous motor. The wound rotor synchronous motor may be applied as an insulating transformer of a charging circuit by being supplied with alternating current (AC) power from an inverter that converts direct current (DC) power of the battery into the AC power to charge the battery and may determine an inductance value of the field coil based on the condition that the wound rotor synchronous motor is operated as a motor and the wound rotor synchronous motor is operated as a transformer to be applied as a part of the charger. Accordingly efficiency of each operating mode may be improved.

According to an exemplary embodiment of the present invention, a charging system may include an inverter configured to convert power of a battery, a wound rotor synchronous motor having at least one stator coil supplied with power converted by the inverter and a rotor having a plurality of field coils, a switching circuit unit configured to selectively supply power to the plurality of field coils, and a controller configured to operate the switching circuit unit to supply power from the battery to at least one of the plurality of field coils when the wound rotor synchronous motor is in a motor mode having the wound rotor synchronous motor supplied with the power from the battery to be operated as a motor and, operate the battery and the field coil to be insulated from each other and the switching circuit unit to supply grid power to a portion of the field coils when the wound rotor synchronous motor is in a charging mode having the wound rotor synchronous motor supply the grid power to the field coil side to charge the battery.

In some exemplary embodiments, the charging system may include a relay disposed between the battery and the switching circuit unit. The controller may short-circuit the relay in the motor mode and open the relay in the charging mode. The field coil may include a plurality of field coils electrically connected in series with each other and the switching circuit unit may include a plurality of switching elements connected to each node formed by the plurality of field coils electrically connected in series with each other.

In another exemplary embodiment, the switching circuit unit may include a plurality of upper switching elements each switching electrical connection between each node formed by the plurality of field coils may be connected in series with each other and a positive (+) terminal of the battery and a plurality of lower switching elements each switching electrical connections between each node formed by the plurality of field coils may be connected in series with each other and a negative (−) terminal of the battery. The lower switching element connected to the node formed by the field coil may be supplied with the power in the motor mode and may not supplied with the power in the charging mode among the plurality of field coils may be implemented as a diode.

Additionally, the charging system may include a rectifying circuit unit configured to rectify the grid power and supply the rectified grid power to the switching circuit unit.

The charging system may include a power factor correction circuit unit configured to correct a power factor of the grid power and convert the corrected factor into DC power.

According to another aspect of an exemplary embodiment of the present invention, a charging system may include an inverter configured to convert power of a battery, a wound rotor synchronous motor having at least one stator coils each supplied with power converted by the inverter and a rotor having a plurality of field coils electrically connected in series with each other, and a switching circuit unit having a plurality of switching elements connected to each node formed by the plurality of field coils connected in series with each other.

Additionally, the charging system may include a first relay having a first terminal connected to a positive (+) terminal of the battery and a second relay having a first terminal connected to a negative (−) terminal of the battery and a controller configured to short-circuit the first and second relays when the wound rotor synchronous motor operates a motor mode having the wound rotor synchronous motor supplied with the power from the battery and open the first and second relays when the wound rotor synchronous motor operates in a charging mode when the wound rotor synchronous motor supplies the grid power to the field coil side to charge the battery.

In particular, the plurality of switching elements may include a plurality of upper switching elements having each of the switching electrical connections between the second terminal of the first relay and each node formed by the plurality of field coils connected in series with each other and a plurality of lower switching elements having each of the switching electrical connections between the second terminal of the second relay and each node formed by the plurality of field coils connected in series with each other. The grid power may be transmitted to the second terminal of the first relay and the second terminal of the second relay, and the controller may be configured to turn the switching element on or to supply power to different field coils in the motor mode and the charging mode.

In some exemplary embodiments, the lower switching element connected to the node formed by the field coil supplied with the power in the motor mode and not supplied with the power in the charging mode among the plurality of field coils may be implemented as a diode. The charging system may include a rectifying circuit unit configured to rectify the grid power and supply the rectified grid power to the switching circuit unit. The charging system may further include a power factor correction circuit unit configured to correct a power factor of the grid power and convert the corrected power factor into DC power.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the disclosure As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
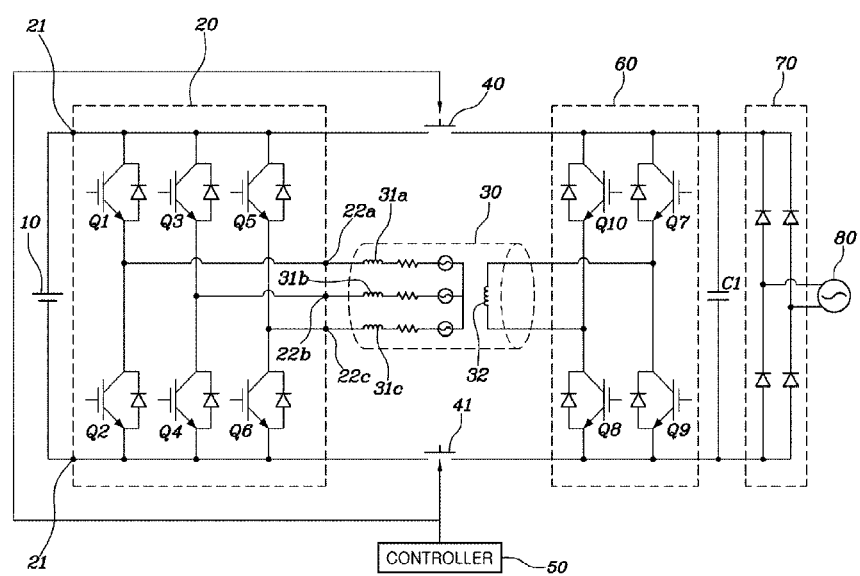
FIG. 1 is an exemplary circuit diagram illustrating a charging system using a wound rotor synchronous motor according to the related art.

Hereinafter, a charging system using a wound rotor synchronous motor according to various exemplary embodiments of the present invention will be described with reference to the accompanying drawings. FIG. 1 is an exemplary circuit diagram illustrating a charging system using a wound rotor synchronous motor of the related art. For full understanding of the present invention, a charging system using a wound rotor synchronous motor disclosed in a prior application by the applicant of the present application will be briefly described. Referring to FIG. 1, a charging system using a wound rotor synchronous motor disclosed in the related art may include a battery 100, an inverter 20, a wound rotor synchronous motor 30, a relay 40, and a controller 50.

A battery 10 may be an energy storage device configured to supply power for driving a motor in an eco-friendly vehicle having the motor that generates a driving force for rotating a wheel of an electric vehicle and a plug-in hybrid vehicle. The battery 10 applied to the eco-friendly vehicle may be discharged when the motor is driven and may be charged when supplied with power from an external grid 80. The inverter 20 may be configured to convert the power of the battery 10 and output a plurality of AC powers having different phases to the motor 30. For example, the inverter 20 may be a bi-directional inverter that is selectively operated to convert a plurality of alternating current power induced to a stator coil of the wound rotor synchronous motor 30 into direct current power and supply the direct current power to the battery 10.

The inverter 20 may have a first input/output terminal 21 connected to the battery 10 and second input/output terminals 22a, 22b, 22c connected to the motor 30. During driving of the motor 30, the inverter 20 may be configured to receive power of the battery 10 from the first input/output terminal 21 and convert the power into AC power having a plurality of phases using switching elements Q1 to Q6 and outputs the AC power to the plurality of second input/output terminals 22a, 22b, and 22c, respectively. Typically, technologies for driving the motor using three-phase power having a phase difference of 120° are applied. Various exemplary embodiments of the present invention will be described based on the inverter 20 performing three-phase power conversion and the three-phase motor 30.

The wound rotor synchronous motor 30 may include a plurality of stator coils 31a, 31b, and 31c may be configured to receive a plurality of alternating current (AC) power having different phases from the inverter 20 and a rotor having a field coil 32 magnetically coupled with the plurality of stator coils 31a, 31b, and 31c by forming mutual inductance with them. The wound rotor synchronous motor 30 may be configured to directly control a magnetic flux by applying the field coil 32. By the magnetic flux control, the wound rotor synchronous motor 30 may be configured to generate a high torque output similar to a permanent magnet type synchronous motor in a middle and low speed region of a vehicle and may have characteristics suitable for high speed operation like an induction motor, and therefore is suitable as a motor applied to an eco-friendly vehicle. The wound rotor synchronous motor 30 has an arm capable of providing power of the battery 10 to the field coil 32 for the magnetic flux control of the field coil 32. In various exemplary embodiments of the present disclosure, in order for the wound rotor synchronous motor 30 to charge even the battery 10, the wound rotor synchronous motor 30 has a relay 40 that may be used to selectively connect or disconnect the electrical connection between the battery 10 and the field coil 32.

The relay 40 may be operated by the controller 50 to be in a short-circuit or open state. In other words, the controller 50 may be configured to adjust the relay 40 to be in the short-circuit state to drive the wound rotor synchronous motor 30 when the vehicle is driven. Accordingly, the wound rotor synchronous motor 30 may be driven using the magnetic flux generated in the field coil 32 by the power of the battery 10. Conversely, when grid power is applied to the field coil 32 to charge the battery 10, the relay 40 may be adjusted to the open state to transmit the grid power from the field coil 32 to the stator coils 31a, 31b, and 31c by mutual inductance and the battery 10 may be charged. In other words, in various exemplary embodiments of the present invention, the relay 40 may distinguish between when the motor is driven and when the battery is charged and enables a field winding to form a magnetic flux for driving the motor and may be connected to the grid 80 to electrically separate the battery 10 from the grid 80 when the battery 10 is charged.

In FIG. 1, reference numeral '60' denotes a plurality of switching elements Q7 to Q10 as a switching circuit that may be operated as a single-phase output inverter for providing AC power to the field coil 32. Further, a rectifying circuit 70 may be configured for rectifying the grid power. In addition, in an exemplary embodiment a power factor correction circuit unit may be disposed between the grid 80 and the switching circuit unit 60 to improve a power factor by eliminating reactive power of grid power while converting AC into DC. In FIG. 1, switching elements Q1 to Q10 provided in the inverter 20 and the switching circuit unit 60 having a full bridge circuit structure may be turned on/off when the wound rotor synchronous motor 30 is driven or when the battery 10 is charged, in which the operate of the switching elements Q1 to Q10 may be operated by the controller 50 illustrated in FIG. 1. The controller 50 illustrated in FIG. 1 may be configured to operate the relay 40 and performs various operations required to operate the operation of the wound rotor synchronous motor 30 and will be understood as a comprehensive element that provides a command signal according to the operation result to elements to be controlled.

In an exemplary embodiment of the present invention illustrated in FIG. 1, for charging the battery 10, when the controller 50 operates the relay 40 to be in the open state and connects the grid 80, the grid voltage rectified by the rectifier 70 may be applied to the switching circuit unit 60. When a capacitor having sufficiently reduced capacitance as a DC link capacitor C1 is applied, a voltage (e.g., which has twice a frequency of a grid voltage) obtained by applying an absolute value of the grid voltage may be applied to the switching circuit unit 60. For example, to satisfy the power factor condition of the system, a current equal to the frequency of the grid may be transmitted in the field coil 32 to appropriately operate the switching elements Q7 to Q10 of the switching circuit unit 60, thereby generating the desired frequency. When the AC power is applied to the field coil 32, a current may be induced into the stator coils 31a to 31c that form the mutual inductance with the field coil 32, and power induced by operating the switching elements Q1 to Q6 of the inverter 20 may be converted into power to be transmitted to the battery 10, thereby charging the battery 10.

In the charging system using a wound rotor synchronous motor, the inductance of the field coil 32 is may be designed to efficiently illustrate a function of a motor that is an original function of the existing wound rotor synchronous motor 30. Accordingly, when the wound rotor synchronous motor is applied to be operated as the charger, the field coil 32 may not be suitable for achieving optimum efficiency as the charger. The present disclosure optimizes efficiency in the operating mode of both the motor and the charger by selectively changing the inductance of the field coil of the wound rotor synchronous motor based on the operating mode.

Figure 2:
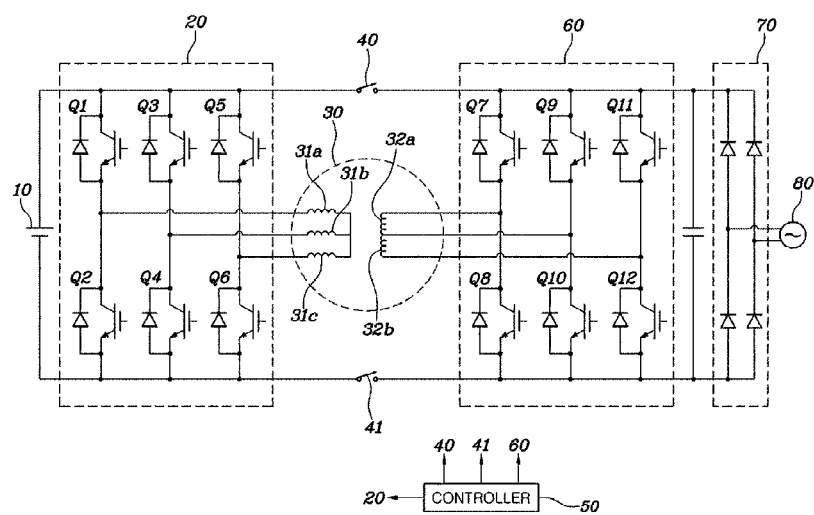
FIG. 2 is an exemplary circuit diagram illustrating a charging system using a wound rotor synchronous motor according to an exemplary embodiment of the present disclosure.
Figure 3:
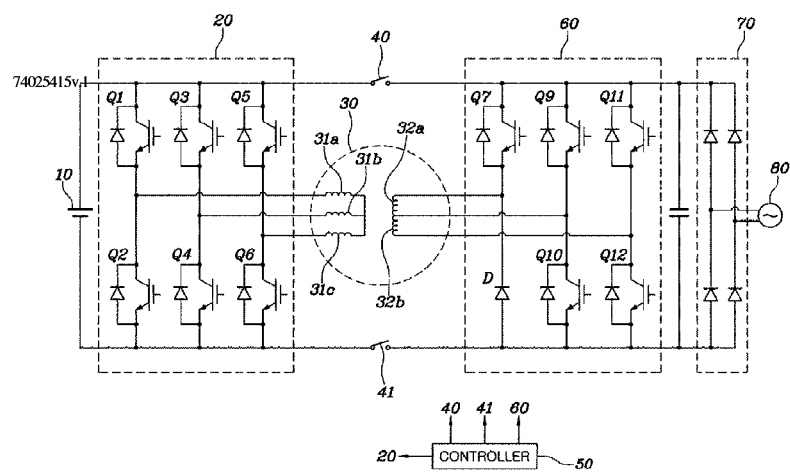
FIG. 3 is an exemplary circuit diagram illustrating a charging system using a wound rotor synchronous motor according to another exemplary embodiment of the present disclosure.

FIG. 2 is an exemplary circuit diagram illustrating a charging system using a wound rotor synchronous motor according to an exemplary embodiment of the present invention. FIG. 3 is an exemplary circuit diagram illustrating a charging system using a wound rotor synchronous motor according to another exemplary embodiment of the present invention. In the exemplary embodiment illustrated in FIG. 2, the field coil of the wound rotor synchronous motor 30 may be implemented by two field coils connected in series with each other (e.g., a first field coil 32a and a second field coil 32b). In this exemplary embodiment, the switching circuit unit 60 may include two switching elements Q7 and Q8 each connected to nodes by a first end of the first field coil 32a, two switching elements Q9 and Q10 each connected to nodes corresponding to connection terminals of the first field coil 32a and the second field coil 32b and two switching elements Q11 and Q12 each connected to nodes formed by the second terminal of the second field coil 32b.

In particular, the switching elements connected between the second terminal of the relay 40 having the first terminal connected to a first end to a positive (+) terminal side of the battery 10. In other words, a positive terminal of the battery 10 among the switching elements configuring the switching circuit unit 60 and the field coil may be referred to as an upper switching element. The switching elements connected between the second terminal of the relay 41 having the first terminal connected to a negative (−) terminal of the battery 10. In other words, a negative (−) terminal of the battery 10 and the field coil may be referred to as a lower switching element.

Further, the terminals having the upper switching elements Q7, Q9 and Q11 and the positive (+) terminal of the battery 10 are connected and the lower switching elements Q8, Q10 and Q12 and the negative (−) terminal of the battery 10 are connected may be connected to a grid power source. In the exemplary embodiment of FIG. 2, the terminals having the upper switching elements Q7, Q9 and Q11 and the positive (+) terminal of the battery 10 that are connected may be connected to the positive (+) terminal of the rectifying circuit unit 70 rectifying the grid power and the terminal to which the lower switching elements Q8, Q10 and Q12 and the negative (−) terminal of the battery 10 are that are connected may be connected to a negative (−) terminal of the rectifying circuit unit 70.

In this exemplary embodiment, when the wound rotor synchronous motor 30 is in a motor mode in which it is supplied with power from the battery 10 to be operated as the motor, the controller 50 may be configured to operate the switching elements Q7 to Q11 of the switching circuit unit 60 to supply power to at least one of the plurality of field coils 32a and 32b from the battery 10, thereby forming a magnetic flux. Further, when the wound rotor synchronous motor 30 operates in a charging mode during application of the grid power to the field coils 32a and 32b to charge the battery, the controller 50 may insulate the battery 11 from the field coils 32a and 32b and may be configured to operate the switching elements Q7 to Q11 of the switching circuit unit 60 to provide the grid power to a portion of the other field coils.

For example, when the first field coil 32a has an inductance optimized for the operation of the motor of the wound rotor synchronous motor 30 and the second field coil 32b has an optimized inductance when operated as the charger of the wound rotor synchronous motor 30, that is, operated as the transformer having the field coil as a primary side and the stator coil as a secondary side are configured to output an induced voltage and an induced current by the mutual inductance will be described. The controller 50 may be configured to short-circuit the relays 40 and 41, short-circuit the switching element Q7 among the upper switching elements and the switching element Q10 among the lower switching elements and open the remaining switching elements when the wound rotor synchronous motor is operated in the motor mode to form a magnetic flux by the first field coil 32a. Accordingly, the motor may be operated in the motor mode.

Further, the controller 50 may be configured to open the relays 40 and 41 and may alternately open or short-circuit a pair of the switching element Q9 among the upper switching elements and the switching element Q12 among the lower switching elements and a pair of the switching element Q11 among the upper switching elements and the switching element Q10 among the lower switching elements when the wound rotor synchronous motor is operated in the charging mode. Accordingly, an alternating current may be transmitted in the second field coil 32b to induce a voltage or current into the first field coil 32a.

As another exemplary embodiment, the case in which the resultant inductance of the first field coil 32a and the second field coil 32b has an inductance optimized for the operation of the motor of the wound rotor synchronous motor 30 and the second field coil 32b has an optimized inductance when operated as the charger of the wound rotor synchronous motor 30. In other word, when operated as the transformer having the field coil as the primary side and the stator coil as the secondary side configured to output the induced voltage and the induced current by the mutual inductance will be described as follows. The controller may be configured to 50 short-circuit the relays 40 and 41, short-circuit the switching element Q7 among the upper switching elements and the switching element Q12 among the lower switching elements, and open the remaining switching elements when the wound rotor synchronous motor is operated in the motor mode to form the magnetic flux by the first field coil 32a and the second field coil 32b. Accordingly, the motor may be operated in the motor mode.

Further, the controller 50 may be configured to open the relays 40 and 41 and may alternately open or short-circuit a pair of the switching element Q9 among the upper switching elements and the switching element Q12 among the lower switching elements and a pair of the switching element Q11 among the upper switching elements and the switching element Q10 among the lower switching elements when the wound rotor synchronous motor is operated in the charging mode to transmit alternating current in the second field coil 32b to induce a voltage or current into the first field coil 32a.

As described above, according to the charging system using the wound rotor synchronous motor, when the field coil of the wound rotor synchronous motor is provided in plural and the wound rotor synchronous motor is operated in each of the motor mode and the charging mode, the field coil may be selectively used to have the inductance suitable for the corresponding modes and optimal efficiency may be achieved for each mode.

The exemplary embodiment illustrated in FIG. 3 illustrates an example of the lower switching elements applied as a diode in the exemplary embodiment illustrated in FIG. 2. In the exemplary embodiment of FIG. 2, the first field coil 32a may be supplied with power when the wound rotor synchronous motor 10 is operated in the motor mode. In other words, in the exemplary embodiment when one first field coil 32a is used as the field coil in the motor mode and in the exemplary embodiment when both of the first field coil 32a and the second field coil 32b are used as the field coil in the motor mode, the field coil 32a may be used as the field coil provided in the rotor of the motor mode and may not be used for power conversion in the charging mode.

Considering that the field current supplied to the field coil is unidirectional in the motor mode, the lower switching element connected to the first field coil 32*a* may be supplied with power in the motor mode and may not be supplied with power in the charging mode and may be implemented as a diode D. According to the charging system using a wound rotor synchronous motor, when the field coil of the wound rotor synchronous motor is provided in plural and the wound rotor synchronous motor is operated in the motor mode and the charging mode, the field coil may be selectively used to generate the inductance suitable for the corresponding modes. Accordingly, the optimum efficiency for each mode may be achieved.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A charging system, comprising:
    an inverter configured to convert power of a battery;
    a wound rotor synchronous motor having at least one stator coil supplied with power converted by the inverter and a rotor having a plurality of field coils;
    a switching circuit unit configured to selectively supply power to the plurality of field coils; and
    a controller configured to:
        operate the switching circuit unit to supply power from the battery to at least one of the plurality of field coils when the wound rotor synchronous motor is in a motor mode in which the wound rotor synchronous motor is supplied with the power from the battery to be operated as a motor; and
        operate the battery and the field coil to be insulated from each other and the switching circuit unit to supply grid power to a portion of the field coils when the wound rotor synchronous motor is in a charging mode in which the wound rotor synchronous motor supplies the grid power to the field coil side to charge the battery.

2. The charging system of claim 1, further comprising:
    a relay disposed between the battery and the switching circuit unit,
    wherein the controller is configured to short-circuit the relay in the motor mode and open the relay in the charging mode.

3. The charging system of claim 1, wherein the field coil includes a plurality of field coils connected in series with each other, and the switching circuit unit includes a plurality of switching elements connected to each node formed by the plurality of field coils connected in series with each other.

4. The charging system of claim 3, wherein the switching circuit unit includes a plurality of upper switching elements each switching electrical connection between each node formed by the plurality of field coils connected in series with each other and a positive (+) terminal of the battery and a plurality of lower switching elements each switching electrical connection between each node formed by the plurality of field coils is connected in series with each other and a negative (−) terminal of the battery.

5. The charging system of claim 4, wherein the lower switching element connected to the node formed by the field coil supplied with the power in the motor mode and not supplied with the power in the charging mode among the plurality of field coils is implemented as a diode.

6. The charging system of claim 1, further comprising:
    a rectifying circuit unit configured to rectify the grid power and supply the rectified grid power to the switching circuit unit.

7. The charging system of claim 1, further comprising:
    a power factor correction circuit unit configured to correct a power factor of the grid power and convert the corrected power factor into DC power.

8. A charging system, comprising:
    an inverter configured to convert power of a battery;
    a wound rotor synchronous motor having at least one stator coils each supplied with power converted by the inverter and a rotor having a plurality of field coils connected in series with each other;
    a switching circuit unit having a plurality of switching elements connected to each node formed by the plurality of field coils connected in series with each other;
    a first relay having a first terminal connected to a positive (+) terminal of the battery and a second relay configured to have a first terminal connected to a negative (−) terminal of the battery; and
    a controller configured to:
        short-circuit the first and second relays when the wound rotor synchronous motor is in a motor mode in which the wound rotor synchronous motor is supplied with the power from the battery to be operated as a motor; and
        open the first and second relays when the wound rotor synchronous motor is in a charging mode in which the wound rotor synchronous motor supplies the grid power to the field coil side to charge the battery,
    wherein the plurality of switching elements include a plurality of upper switching elements each switching electrical connection between a second terminal of the first relay and each node formed by the plurality of field coils connected in series with each other and a plurality of lower switching elements having each switching electrical connection between a second terminal of the second relay and each node formed by the plurality of field coils connected in series with each other,
    wherein the grid power is transmitted to the second terminal of the first relay and the second terminal of the second relay, and
    wherein the controller is configured to turn on or off of the switching element to supply power to different field coils in the motor mode and the charging mode.

9. The charging system of claim 8, wherein the lower switching element connected to the node formed by the field coil supplied with the power in the motor mode and not supplied with the power in the charging mode among the plurality of field coils is implemented as a diode.

10. The charging system of claim 8, further comprising:
    a rectifying circuit unit configured to rectify the grid power and supply the rectified grid power to the switching circuit unit.

11. The charging system of claim 8, further comprising:
    a power factor correction circuit unit configured to correct a power factor of the grid power and convert the corrected power factor into direct current (DC) power.

* * * * *